United States Patent [19]

Andou et al.

[11] Patent Number: 4,861,139
[45] Date of Patent: Aug. 29, 1989

[54] APPARATUS FOR POSITIONING AN OPTICAL ELEMENT

[75] Inventors: Nobuyoshi Andou; Hitoshi Imai, both of Amagasaki, Japan

[73] Assignee: Mitsubishi Denki Kabushiki, Tokyo, Japan

[21] Appl. No.: 222,764

[22] Filed: Jul. 22, 1988

[30] Foreign Application Priority Data

Jul. 24, 1987 [JP] Japan .................... 62-114012[U]

[51] Int. Cl.$^4$ ................................. G02B 7/02
[52] U.S. Cl. ................................. 350/255; 350/252
[58] Field of Search ............ 350/255, 252, 245, 251; 248/568, 611, 616

[56] References Cited

U.S. PATENT DOCUMENTS

| 4,252,411 | 2/1981 | Nomura | 350/255 |
| 4,330,176 | 5/1982 | Kawai | 350/255 |
| 4,351,587 | 9/1982 | Matsuo et al. | 350/255 |
| 4,372,650 | 2/1983 | Lisfeld et al. | 350/252 |

FOREIGN PATENT DOCUMENTS 56-56265 5/1981 Japan .
60-142829 9/1985 Japan .
62-42116 3/1987 Japan .

Primary Examiner—Rodney B. Bovernick
Assistant Examiner—Loha Ben
Attorney, Agent, or Firm—Wolf, Greenfield & Sacks

[57] ABSTRACT

The present invention relates to an optical head for optically recording or reproducing information. In the optical head of the present invention a holder is provided with an optical element fixedly attached thereto. The holder is axially movable in a guide bore of a housing member and a tapped hole is formed in the circumference of the housing member which hole does not reach the guide bore so as to create a deformable bottom hole portion. When a screw is screwed into the tapped hole it presses against and deforms the bottom hole portion so as to engage the holder. Accordingly, with the optical head according to the present invention, the rotational torque generated when the screw is rotated is absorbed in the bottom portion of the tapped hole, so that the holder is not moved when the screw is screwed into the tapped hole, whereby the optical element fixedly disposed on the holder can be easily positioned at an appointed position.

11 Claims, 4 Drawing Sheets

APPARATUS FOR POSITIONING AN OPTICAL ELEMENT

BACKGROUND OF THE INVENTION

This invention relates to an optical head of an optical recording and reproducing device for optically carrying out the recording and the reproduction of information or either of them.

DESCRIPTION OF THE PRIOR ART

FIG. 1 and FIG. 2 is a perspective view and a sectional view, respectively, showing the principal parts of the conventional optical head disclosed for example in Japanese Utility Model application Laid-Open No. 142829/1985. Referring now to FIGS. 1, 2, reference numeral 1 designates a housing member for housing a light source, an optical detector and the like (not shown) therein, the housing member 1 being provided with a guide hole 2 formed therein, and the guide hole 2 being provided with a cylindrical holder 3, which is provided with at least one optical element (not shown) fixedly disposed thereon, movably engaged therewith in the axial direction. A fixing screw 4 is screwed in a tapped hole 16 which is a through hole formed in the housing member 1, whereby the holder 3 is fixed to the housing member 1.

Next, the procedure for fixing the holder 3 to the housing member 1 is described.

At first, the holder 3 is put in said guide hole 2. Then, the holder 3 is moved in the axial direction to be positioned so that the optical element, which is fixedly disposed on the holder 3, may be disposed at the appointed position determined in view of the optical design. Finally, the fixing screw 4 is screwed into the tapped hole 16 to fix the holder 3.

Usually, accuracy of micron order is required for the positioning of the optical element. However, since the end of the threaded portion of the fixing screw 4 is in general unevenly shaped with the above described conventional optical head, when the fixing screw 4 is screwed up, the position at which the holder 3 is first engaged with the fixing screw 4 does not come on the central axis 4a of the fixing screw 4, whereby the holder 3 is moved by the fixing screw 4 until the appointed value of torque, at which the rotation of the fixing screw 4 is stopped, is obtained, as shown in FIG. 2. Accordingly, the conventional optical head has a problem in that it is difficult to dispose the optical element, which is fixedly disposed on the holder 3, at the appointed position.

SUMMARY OF THE INVENTION

The present invention was achieved for solving the above described problem. In the optical head according to the present invention, a tapped hole is not a through hole reaching a guide hole 2, but an opening with a bottom portion left and a fixing screw having a conical end is provided which is screwed into such a tapped hole and the end of the screw presses the bottom portion to deform the same causing the deformed portion to engage the holder and thereby fix the holder to the housing member.

Thus, it is a first object of the present invention to provide an optical head capable of easily fixedly disposing an optical element, which is fixedly disposed on a holder, at an appointed position.

It is a second object of the present invention to provide an optical head without requiring readjustment since the holder, which has finished the positional adjustment of the optical element, is not moved when fixed.

The above and further objects and features of the invention will more fully be apparent from the following detailed description with accompanying drawings.

DESCRIPTION OF THE PREFERRED EMBODIMENTS

The preferred embodiments of the present invention will be hereinafter concretely described.

Figure 1:
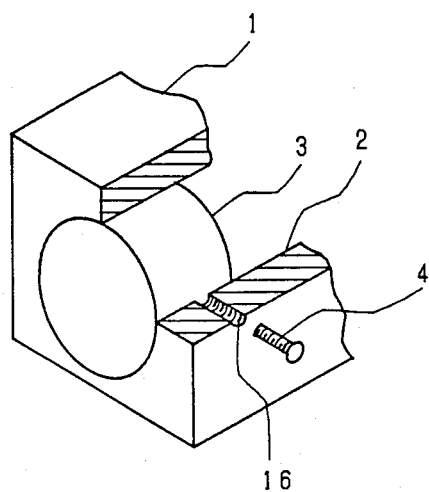
FIG. 1 is a perspective view showing principal parts of the conventional optical head.
Figure 2:
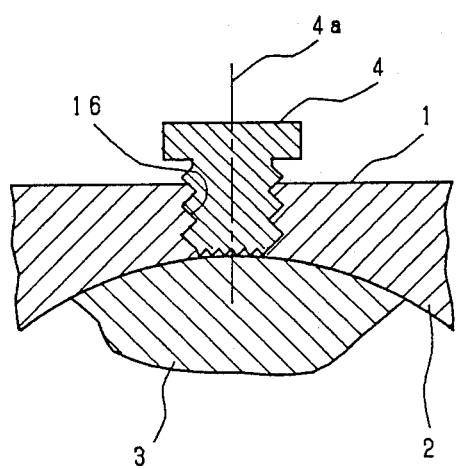
FIG. 2 is an enlarged sectional view showing principal parts of the conventional optical head.
Figure 3:
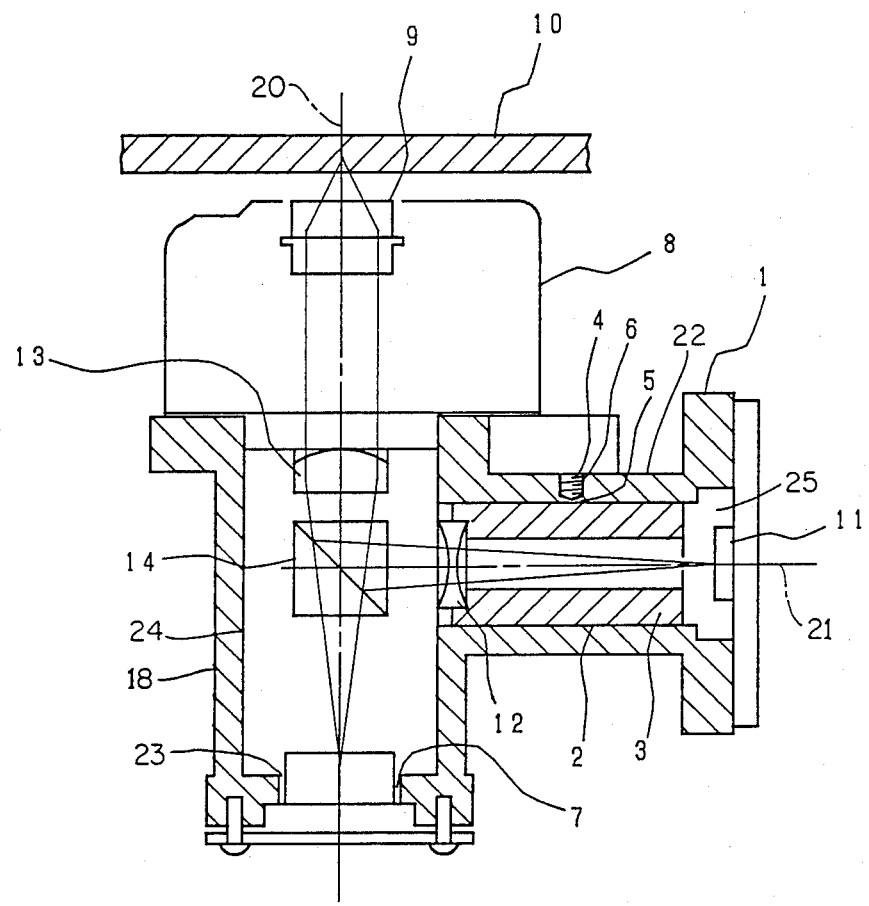
FIG. 3 is a sectional view showing an optical head according to the present invention.
Figure 4:
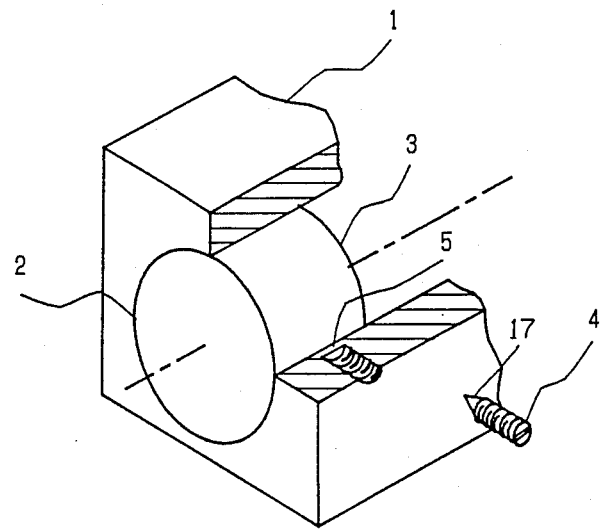
FIG. 4 is an enlarged perspective view showing principal parts of an optical head according to the present invention.

FIG. 3 is a sectional view showing an optical head according to the present invention and FIG. 4 is a partial perspective view showing the optical head shown in FIG. 3. Referring to FIGS. 3, 4, reference numeral 1 designates a housing member provided with a first cylindrical tube 18 aligned along a first optical axis 20 and a second cylindrical tube 22, extending from an opening in the wall of the first tube 18, which is aligned along a second optical axis 21 substantially perpendicular to first optical axis 20. Tube 18 has an axial cylindrical guide bore 24 and tube 22 has an axial cylindrical guide bore 2. Reference numeral 8 designates an actuator and reference numeral 10 designates a medium. The housing member 1 is provided with a light source 7 disposed on an opened portion 23 at the bottom end of tube 18, a prism 14 serving as a half mirror and a lens 13 for converting diverging light from the light source 7 into parallel light being disposed with optical axes thereof coincided with each other along the first optical axis 20, and an objective lens 9 also aligned on axis 20 for condensing the parallel light from the lens 13 onto the medium 10 to form an image being housed in the actuator 8.

The housing member 1 is provided with an optical detector 11 for detecting a reflected light from the medium 10. Detector 11 is disposed on an opened portion 25 at the end of the tube 22. A cylindrical holder 3, having a lens 12 for condensing the reflected light from the medium 10 onto the optical detector 11 fixedly disposed thereon, is positioned in the guide hole 2 so as to be movable in the axial direction along second optical axis 21. The housing member 1 is provided with a tapped hole 6 formed on the circumference of the tube 22 which does not reach the guide hole 2, in short, so as to leave a wall portion 5 having a relatively minor thickness so as to be deformable. A fixing screw 4 having conical end 17 is screwed into said tapped hole 6 wherein the conical end engages and deforms bottom portion 5 so as to engage holder 3 and thereby fix the holder 3 in the guide hole 2 of the housing member 1.

Next, the optical path in such an optical head is described.

A diverging light emitted from the light source 7 is passed through the prism 14 to be turned into a parallel light by means of the lens 13 followed by focusing on the medium 10 in the form of a condensed spot by means of the objective lens 9 disposed within the actuator 8. Light source 7, prism 14, lens 13, lens 9 and medium 10 are all aligned along a first axial direction 20. The light focused on the medium 10 is reflected and then turned into a parallel light by means of the objective lens 9 followed by being condensed by means of the lens 13 and reflected by the prism 14 to change a course thereof by 90° onto a second axial direction 21. The light reflected by the prism 14 is collected onto the optical detector 11 by means of the lens 12. Lens 12 and detector 11 are each aligned along the second axial direction 21.

In this manner, it is possible to adjust the position of the lens 12 so that the light led to the optical detector 11 may be accurately focused on the optical detector 11. Furthermore, since the lens 12 is fixedly disposed on the holder 3 and the holder 3 becomes accurately fixed to the housing member 1, then the position of the lens 12 is finally and accurately determined.

Figure 5:
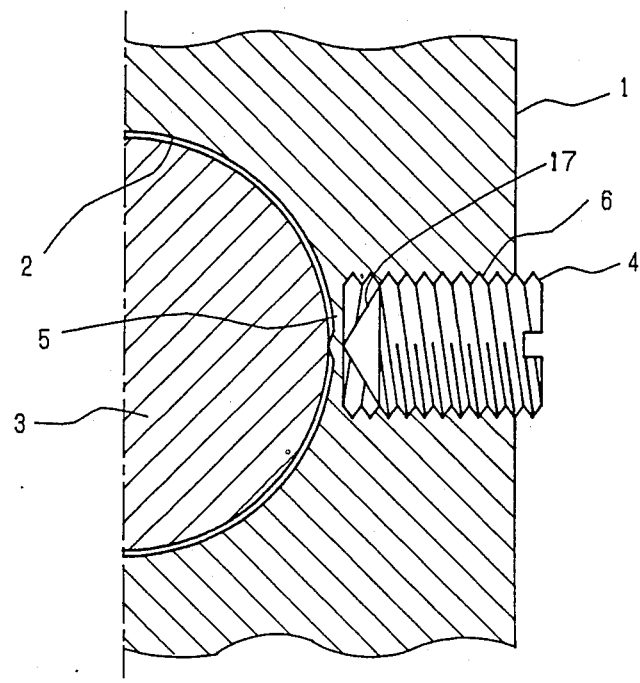
FIG. 5 is an enlarged sectional view showing principal parts of an optical head according to the present invention.

Next, the method of determining the position of the lens 12 and the method of fixing the holder 3 in the optical head according to the present invention are described with reference to FIG. 5 in detail showing the fixed condition.

At first, the holder 3 is moved in the axial direction 21 to adjust the position of the lens 12 so that the light led to the optical detector 11 may be accurately focused on the optical detector 11. After finishing the positional adjustment of the lens 12, the fixing screw 4 is screwed up along the tapped hole 6 provided in the housing member 1. Thus, since the tapped hole 6 is formed with the bottom portion 5 left, the bottom portion 5 of the tapped hole 6 is deformed as the fixing screw 4 is screwed up to some extent and the deformed bottom portion 5 is pressed by the fixing screw 4 into engagement with the holder 3, whereby the holder 3 is fixed to the housing member 1, (refer to FIG. 5).

As above described, according to the present invention, since the holder 3 is pressed by the fixing screw 4 through the bottom portion 5 of the tapped hole 6 when the holder 3 is fixed to the housing member 1, the torque of rotation generated when the fixing screw 4 is rotated is absorbed in the bottom portion 5 of the tapped hole 6, whereby only the fastening force is transmitted to the holder 3. Thus, the holder 3, of which positional adjustment of the lens 12 was accomplished, is not moved when fixed, so that the position of the optical element is not changed and the optical element can be easily disposed at the appointed position. Accordingly, it is unnecessary to readjust the position of the holder 3.

Figure 6:
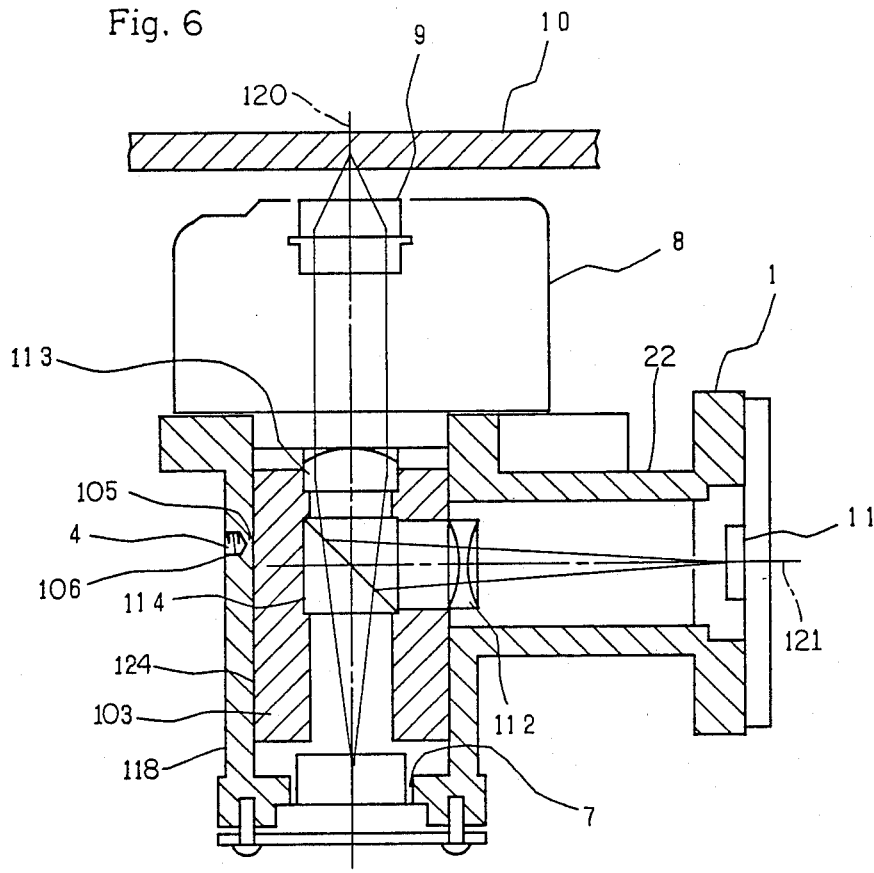
FIG. 6 is a sectional view showing an alternative embodiment of the present invention.

In addition, although the lens 12 for condensing a light onto the optical detector 11 is fixedly disposed on the holder 3 in the above described preferred embodiment, the construction is not limited by this. Alternatively, as shown in FIG. 6, holder 103 may be slidably movable in guide bore 124, aligned along the first optical axis 120, and lens 113 and prism 114 are connected thereto. In this embodiment, holder 103 has a 90° open side channel adjacent prism 114 in which lens 112 is disposed, for aligning both prism 114 and lens 112 along the second optical axis 121. Tapped hole 106 with bottom portion 105 is now provided in tube 118 for fixing holder 103 within guide bore 124.

In addition, in the cases where other optical elements, such as ½ wavelength plate, ¼ wavelength plate and refractive lattice, are housed in the housing member 1, one or more of said other optical elements may be fixedly disposed on the holder 3.

As this invention may be embodied in several forms without departing from the spirit of essential characteristics thereof, the present embodiment is therefore illustrative and not restrictive, the scope of the invention being defined by the appended claims rather than by the description preceding them, and all changes that fall within the meets and bounds of the claims, or equivalence of such meets and bounds thereof and are therefore intended to be embraced by the claims.

What is claimed is:

1. Apparatus for positioning an optical element comprising:
    a housing member having a guide bore formed therein, the bore being aligned along an optical axis;
    a holder axially movable within the guide bore;
    an optical element attached to the holder so as to be movable along the optical axis;
    the housing member having a tapped hole disposed substantially perpendicular to the optical axis, said tapped hole terminating short of the guide bore and having defined at the base thereof a deformable bottom wall portion provided between the tapped hole and guide bore; and
    a screw having a first end which is screwed into the tapped hole to cause the bottom wall portion to deform and engage the holder for fixing the holder to the housing member.

2. The apparatus of claim 1, wherein the screw has a conical end portion for engaging and deforming the bottom wall portion.

3. Apparatus for positioning an optical element comprising:
    a housing member having a first guide bore formed therein aligned along a first optical axis and a second guide bore formed therein aligned along a second optical axis;
    a holder axially movable within one of the first and second guide bores;
    a first optical element attached to the holder so as to be movable along one of said optical axes of one of said guide bores;
    the housing member having a tapped hole disposed substantially perpendicular to said one of said optical axes, said tapped hole terminating short of said one of said guide bores and having defined at the base thereof a deformable bottom wall portion provided between the tapped hole and said one of said guide bores; and
    a screw having a first end which is screwed into the tapped hole to cause the bottom wall portion to deform and engage the holder for fixing the holder to the housing member.

4. The apparatus of claim 3, further comprising a light source and an optical detector operatively connected to the housing member so as to form a light path therebetween, wherein the first optical element is disclosed in the light path between the source and the detector.

5. The apparatus of claim 4, wherein the detector is positioned on the second optical axis and the first optical element comprises a condensing lens for focusing light on the detector.

6. The apparatus of claim 4, wherein the light source and a medium which receives light from the source and from which light is reflected to the detector are each disposed along the first optical axis, the holder is movable within the first guide bore, other optical elements are attached to the holder including a half mirror aligned along both the first and second optical axes for directing reflected light from the medium to the detector, and the holder has an open side channel aligned along the second optical axis to which the first optical element is attached.

7. The apparatus of claim 6, wherein the detector is positioned on the second optical axis, the first optical element and the holder are movable along the first optical axis, and the first optical element comprises a condensing lens for focusing light on the detector.

8. The apparatus of claim 7, wherein the other optical elements include a second lens aligned along the first optical axis for directing reflected light from the medium to the half mirror.

9. The apparatus of claim 8, wherein the second lens also directs light from the source to the medium.

10. The apparatus of claim 3, wherein the holder is movable within the first guide bore.

11. The apparatus of claim 3, wherein the holder is movable within the second guide bore.

* * * * *

UNITED STATES PATENT AND TRADEMARK OFFICE
CERTIFICATE OF CORRECTION

PATENT NO. : 4,861,139

DATED : August 29, 1989

INVENTOR(S) : Andou, et al.

It is certified that error appears in the above-identified patent and that said Letters Patent is hereby corrected as shown below:

Col. 2, line 65, after "a" (first occurrence) add --bottom--.

Signed and Sealed this

Twenty-second Day of May, 1990

Attest:

*Attesting Officer*

HARRY F. MANBECK, JR.

*Commissioner of Patents and Trademarks*